United States Patent

Chappell, Jr. et al.

[11] Patent Number: 5,985,437
[45] Date of Patent: *Nov. 16, 1999

[54] INTERDRAW PRETREATMENT FOR POLYESTER FILM

[75] Inventors: Cornell Chappell, Jr., Petersburg; Junaid A. Siddiqui, Richmond, both of Va.

[73] Assignee: E. I. du Pont de Nemours and Company, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/985,135

[22] Filed: Dec. 4, 1997

[51] Int. Cl.$^6$ ............................ B32B 27/08; B32B 27/18; B32B 27/36; B32B 31/16

[52] U.S. Cl. ........................ 428/336; 428/480; 428/483; 428/910; 428/694 BS; 427/322; 427/331; 427/407.1; 528/293; 528/295; 526/167; 526/174; 264/289.3; 264/289.6; 264/290.2

[58] Field of Search .................................. 428/334, 323, 428/336, 353, 480, 482, 483, 694 BS, 910; 264/289.3, 289.6, 290.2; 525/165, 174, 175; 528/293, 295

[56] References Cited

U.S. PATENT DOCUMENTS

| | | | |
|---|---|---|---|
| 5,294,592 | 3/1994 | Noguchi et al. | 503/227 |
| 5,328,770 | 7/1994 | Yoshida et al. | 428/480 |
| 5,391,429 | 2/1995 | Otani et al. | 428/327 |
| 5,540,974 | 7/1996 | Hoseki et al. | 428/141 |
| 5,567,475 | 10/1996 | Hazen et al. | 427/221 |
| 5,789,070 | 8/1998 | Shaw-Klein et al. | 428/216 |

*Primary Examiner*—Vivian Chen

[57] ABSTRACT

An oriented polyester film coated on at least one surface with a coating that improves its adhesion to water-based coatings is disclosed. The coating contains at least one sulfopolyester; at least one tetrablock copolymer resin; and at least one acrylamide/acrylic acid copolymer or salts thereof. Other ingredients, such as particulate materials and surfactants, may be present in the coating. The coating is preferably applied at the interdraw stage.

17 Claims, No Drawings

INTERDRAW PRETREATMENT FOR POLYESTER FILM

FIELD OF THE INVENTION

This invention relates to polyester films. In particular, this invention relates to an oriented polyester film that is coated on at least one surface with a coating that improves its adhesion to water-based hydrophilic coating formulations.

BACKGROUND OF THE INVENTION

Films of polymeric linear polyesters have excellent draw orientation and have proved especially well suited for biaxial film orientation. These polymeric films, especially those of polyethylene terephthalate or PET, are strong and have excellent inherent chemical and thermal properties. In addition, they have good optical clarity, toughness, and static properties, which makes them extremely suitable for use as substrates for ink jet printing. For this application, the film can be transparent, or it can be pigmented with, for example, barium sulfate to have a high gloss.

For ink jet printing the film is coated with an ink receptive coating. As described, for example, in Atherton, European Patent Publication 698,502, the ink receptive coating typically comprises a cellulose derivative, such as hydroxyethyl cellulose or methyl cellulose. Other water soluble components, such as poly(vinyl alcohol), poly(vinyl pyrrolidone), and poly(ethylene oxide) may also be present in the ink receptive coating. However, unprimed polyester film is not very receptive to coating with hydrophilic materials. Adhesion between the hydrophobic unprimed polyester film and the hydrophilic ink receptive is poor.

The polyester film is pretreated to improve its adhesion to the ink receptive coating. An underlayer that improves the adhesion of the film to the ink receptive coating is coated onto the film. Pretreatments that improve the adhesion of polyester films to solvent-based coatings have been disclosed in, for example, Pears, U.S. Pat. Nos. 4,244,270, and 4,391,767. However, these pretreatments are not effective for water-based coatings. Thus, a need exists for a pretreatment that will improve the adhesion of polyester films to water-based coatings.

SUMMARY OF THE INVENTION

The invention is a coated polyester film comprising:
(a) an oriented polyester film, said film comprising a first surface and a second surface, and
(b) a coating on at least one of said surfaces, said coating comprising:
  (1) about 90% by weight to about 99% by weight of at least one sulfopolyester;
  (2) about 0.10% by weight to about 4% by weight of at least one polymer selected from the group consisting of polyacrylic acids, acrylamide/acrylic acid copolymers, and salts thereof; and
  (3) about 0.5% by weight to 7.0% by weight of at least one tetrablock copolymer resin;
in which:
  % by weight of components (1), (2), and (3) is based on the total weight of components (1), (2), and (3) present in the coating;
  components (1), (2), and (3) together comprise at least about 85% of the weight of the dry coating; and
  the dry coating has a thickness of about 0.05 to about 0.40 microns.

In a preferred embodiment of the invention, the coating comprises at least one polymer selected from the group consisting of acrylamide/acrylic acid copolymers and salts thereof. In another preferred embodiment components (1), (2), and (3) together comprise at least 90% by weight of the weight of the dry coating. In another embodiment, the invention is a method for coating a polyester film. The coated polyester film has excellent adhesion to water-based layers.

DETAILED DESCRIPTION OF THE INVENTION

The invention is a polyester film coated on at least one surface with a coating that improves its adhesion to water-based coatings. The coating is preferably applied at the interdraw stage of polyester manufacture.

Polyester Film

Polyester films are well known to those skilled in the art. Preferred polyester films are those of the group consisting of polyethylene terephthalate (PET) film and polyethylene naphthanate film. The most preferred polyester film is polyethylene terephthalate.

The polymer preparation and film manufacturing processes are well known to those skilled in the art and are disclosed in many texts, such as *Encyclopedia of Polymer Science and Engineering,* 2nd. Ed., Vol. 12, Wiley, N.Y., pp. 1–313, as well as in numerous patents, such as UK Patent 838,708. The polymer is typically obtained by condensing the appropriate dicarboxylic acid or its lower alkyl diester with ethylene glycol. Polyethylene terephthalate is formed from terephthalate acid; polyethylene naphthanate is formed from 2,7-naphthalene dicarboxylic acid.

The thickness of the polyester film is not critical and should be appropriate for the intended application for the coated film. The film thickness is generally less than about 250 microns, typically less than about 175 microns, preferably less than 50 microns, and more preferably between 12 to 25 microns. The film can be transparent, or it can be pigmented as required for the intended application.

Coating

The coating, sometimes referred to as an underlayer, a pretreatment, a primer layer or primer coating, comprises at least one sulfopolyester, at least one tetrablock copolymer resin, and at least one polymer selected from the group consisting of polyacrylic acids, acrylamide/acrylic acid copolymers, and salts thereof. Other ingredients may be included in the coating for a specific use.

Sulfopolyesters: Sulfopolyesters are polyester resins containing free sulfonate groups. Free sulfonate group means a group of the formula —$SO_3R$, in which R is hydrogen, ammonium, substituted ammonium, or an alkali metal, such as lithium, sodium, or potassium, and in which the sulfonate group does not participate in the condensation or ester-exchange reaction by which the sulfopolyester is formed. Sulfopolyesters are described in "Sulfopolyesters: New Resins for Water-Based Inks, Overprint Lacquers, and Primers," K. R. Barton, Eastman Chemical Company Publication No. SPI-13.

Formation of sulfopolyesters in conveniently effected by conventional condensation or ester-interchange, at temperatures up to about 275° C., in the presence of an acid catalyst. At least one sulfonated polycarboxylic acid, or its anhydride or lower alkyl, preferably methyl, ester, is reacted with a polyhydric alcohol. Reaction of a dicarboxylic acid, or its anhydride or lower alkyl, preferably methyl, ester, with a dialcohol to form a linear polyester is preferred. Preferably, at least one unsulfonated polycarboxylic acid, preferably dicarboxylic acid, or its anhydride or lower alkyl, preferably methyl, ester, is also present. Preparation of sulfopolyester resins is disclosed in U.S. Pat. No. 3,734,874.

Sulfopolyester resins are sold by the Eastman Chemical Company as Eastek® resins. Eastek® resins of the 1000, 1100, 1200, 1300, and 2100 series can be used in the coating. Eastek® 1300 resins are preferred. Suitable sulfopolyester resins include the ammonium and alkali metal, preferably sodium, salts.

Polyfunctional Block Copolymers

The coating comprises a polyfunctional block copolymer derived from sequential addition of propylene oxide and ethylene oxide to a polyamine. These copolymers promote wet adhesion between water-based coating and the polyester film.

Tetra-functional block copolymers derived from sequential addition of propylene oxide and ethylene oxide to ethylene diamine are preferred. Block co-polymers in which the ethylene oxide blocks are formed first, and thus are attached to the amine, are preferred. These polymers are marketed as Tetronic® R surfactants (BASF, Parsippany, N.J.). A preferred tetra-functional polyfunctional block copolymer is Tetronic® 90R4 surfactant, which has a molecular weight of 7240.

Polyacrylic Acid and Acrylamide/acrylic Acid Copolymers

The coating comprises at least one polymer selected from the group consisting of polyacrylic acids, acrylamide/acrylic acid copolymers, and salts of these polymers and copolymers. Acrylamide/acrylic acid copolymers and their salts are preferred. The copolymer preferably comprises about 25% by weight to about 60% by weight of acrylic acid, more preferably about 30% by weight to about 50% by weight acrylic acid.

Polyacrylic acids are available from various manufacturers under various tradenames, such as, Good-rite® K-702, K-732, K-752, K-7058N, K-7200N, K-7600N, and K-7658 (Goodrich, Cleveland, Ohio), Acusol® 445 (Rohm & Haas, Philadelphia, Pa.) and Dupolite C-433 and C-464 (Rohm & Haas, Philadelphia, Pa.). Copolymers of acrylamide and acrylic acid are typically commercially available as salts, typically sodium salts. Poly(acrylamide/acrylic acid) sodium salts are available from various manufacturers under various tradenames, such as, Reten® 421, 423, and 425 (Hercules, Wilmington, Del.), Hoe S 2793 (Hoechst Celanese, Charlotte, N.C.), and Hostacerin PN 73 (Hoechst Celanese, Charlotte, N.C.).

The molecular weight of the polymers or copolymers is preferably greater than 20,000, more preferably greater than two million. Those with even higher molecular weights, for example ten million or greater, are even more preferred.

Either the polymer or copolymer or the corresponding salt can be used to prepare the coating composition. If desired, the polymer or copolymer may be converted to its salt by the addition of a base, such as sodium hydroxide, to the coating composition.

Though not being bound by any theory or mechanism of action, the copolymer may react with the free hydroxyl groups of components of the water-based coating, such as with the free hydroxyl groups of cellulose, to improve both the wet adhesion and the dry adhesion between the water-based coating and the polyester film.

Other Components

The coating may also include other ingredients, or additives, that may further enhance the utility of the coating. Such ingredients include minor amounts of: particulate materials; dyes; pH regulating agents; anti-oxidants; anti-static agents; ultra-violet stabilizers; surfactants; and the like.

An effective amount of a finely divided particulate material, or pigment, may be added to improve the slip properties of the coated polyester film. These particles also increase both the surface roughness and surface area of the film, which enhances its surface adhesion with the water-based coatings. Inorganic pigments include, for example, clay, chalk, talc, magnesium carbonate, zinc oxide, titanium dioxide, barium sulfate, calcium carbonate, glass, and silica organic pigments include fine particles of, for example, cross-linked polystyrene, cross-linked polyvinyl chloride, and cross-linked acrylic polymers and co-polymers, such as cross-linked polymethyl methacrylate.

For applications in which a transparent substrate is required, a material that does not affect the transparency of the polyester film, such as silica, should be used. Submicron sized amorphous fumed silica particles are preferred. For applications in which an opaque film is desired, pigments such as titanium dioxide and calcium carbonate may be used.

The coating may comprise an effective amount of one or more surfactants to improve dispersion of the components in the coating composition and to act as wetting agents to achieve good wetting and leveling when the coating composition is coated on the film. Non-ionic surfactants are preferred. If ionic surfactants are used, the coating composition may be cloudy. Suitable surfactants include alcohol ethoxylates and ethyoxylated alkyl phenols. Ethyoxylated alkyl phenols are preferred non-ionic surfactants.

Composition of the Coating

The dry coating comprises: (1) about 90% by weight to about 99% by weight, preferably about 96% by weight to about 99% by weight, of one or more sulfopolyesters; (2) about 0.5% by weight to about 7.0% by weight, preferably about 1.0% by weight to about 4.0% by weight, of one or more tetrablock copolymer resins; and (3) about 0.1% by weight to about 4% by weight, preferably about 0.2% by weight to about 1.0% by weight, of one or more polymers selected from the group consisting of polyacrylic acids, acrylamide/acrylic acid copolymers, and salts of the polyacrylic acids and acrylamide/acrylic acid copolymers. The percentages by weight of the sulfopolyester or sulfopolyesters, of the tetrablock copolymer resin or resins, and of the polyacrylic acids and/or acrylamide/acrylic acid copolymers and/or salts thereof, are based on the total of the weight of the sulfopolyesters, weight of the tetrablock copolymer resins, and weight of the polyacrylic acids and/or acrylamide/acrylic acid copolymers present in the coating. These three components typically comprise at least about 85% by weight, preferably at least 90% by weight, of the total weight of the dry coating.

Typically about 2% by weight to about 7% by weight, based on the total weight of the dry coating, of particulate material is present in the coating. Typically about 1% by weight to about 5% by weight, based on the total weight of the dry coating, of surfactant is present in the coating. Minor amounts of other materials also may be present as required.

Manufacture

In the typical manufacture of polyester film, polyester resin is melted and extruded as an amorphous sheet onto a polished revolving casting drum to form a cast sheet of the polymer. The cast sheet of polymer is heated to just above its glass transition temperature, 80° C. to 100° C. for polyethylene terephthalate, and is generally stretched or drawn in one or more directions. The film is typically stretched in two directions, the direction of extrusion (longitudinal direction) and perpendicular to the direction of extrusion (transverse direction) to produce a biaxially orientated film. The first stretching, which imparts strength and toughness to the film, conventionally ranges from about 2.0 to about 4.0 times its original length. Subsequent stretchings each also increase the size of the film about 2.0 to about 4.0 times. Generally, it is preferred to stretch first in the longitudinal direction and then in the transverse direction. The film is then heat set, generally at about 190° C. to 240° C. for polyethylene terephthalate, to lock in the strength, toughness, and other physical properties.

The coating is preferably applied before final drawing of the film. For a uniaxially drawn film, the coating composition is preferably applied during a predraw stage. For a biaxially orientated film, the coating composition is preferably applied during an interdraw stage, that is, after the film has been stretched in one direction, but prior to stretching in the orthogonal direction.

The coating is preferably applied "in line" by the manufacturer so that the customer obtains film that is ready to be coated with the desired water-based coating. Coating "off line" by the customer would require that customer have equipment to unwind the uncoated film, coat it, draw the coated film, and then rewind it, making off-line coating time consuming and expensive.

The coating is conveniently applied as an aqueous dispersion. Application from an aqueous medium is economically advantageous, avoids the potential explosion and/or toxicity hazards often associated with the use of volatile organic solvents, and eliminates the problem of residual odor frequently encountered when an organic solvent is used.

A sulfopolyester with a relatively high sulphonate content can generally be dispersed in hot water alone. However, if the sulfopolyester does not disperse in hot water unaided, dispersion can normally be accomplished by addition of a suitable surfactant. It may be advantageous to dissolve the sulfopolyester in a small amount of organic solvent prior to dispersion in water.

The coating composition may be applied as an aqueous dispersion at a concentration and amount sufficient to produce a coating with the desired adherence properties. The coating composition typically comprises about 3% to 18% total solids, preferably about 5% to about 10% total solids. As is well known to those skilled in the art, total solids refers to the total amount of non-volatile material in the coating composition, even though some of these materials may be non-volatile liquids at room temperature.

Any conventional coating method, such as spray coating, roll coating, slot coating, meniscus coating, immersion coating, wire-bar coating, air knife coating, curtain coating, doctor knife coating, direct and reverse gravure coating, and the like, can be used to coat the coating composition. Once the coating has dried, the coated surface is receptive to water-based coatings without further treatment. The coating is typically applied as a continuous coating. The wet coating preferably has a thickness of about 7.5 to about 8.5 microns, as measured by wet infrared gauge. After drying, the coating typically has a thickness of about 0.05 micron to about 0.4 micron, preferably, about 0.1 micron to about 0.2 micron, more preferably about 0.12 micron to about 0.18 micron. The most preferred thickness is 0.15 micron to 0.17 micron.

Depending on the intended application for the film, the coating may be applied to one or both sides of the film. If the coating of the invention is only applied to one side, a different coating may be applied to the other side.

INDUSTRIAL APPLICABILITY

The coated film has excellent adhesion to water-based layers and is useful in any application in which a water-based coating on a polyester film, particularly a polyethylene terephthalate film, is desired, especially in the preparation of ink jet receptor substrates. Ink jet printing technology is widely used for presentation, graphic art, engineering drawing, and office application.

EXAMPLES

| Glossary | |
|---|---|
| Eastek ® 1300 | Sulfopolyester (30%) in water (Eastman Chemical Co., Kingsport, TN) |
| OX-50 | Amorphous fumed silica (Degussa, Ridgefield Park, NJ) |
| Poly(acrylamide/acrylic acid, sodium salt) | Mw > 10 million, 40% carboxyl groups; (Polysciences, Warrington, PA) |
| Renex ® 690 | Nonoxynol-10 nonionic surfactant (ICI Americas, Wilmington, DE) |
| Tetronic ® 90R4 | Tetra-functional block copolymer derived from sequential addition of ethylene oxide and then propylene oxide to ethylene diamine; MW = 7,240; viscosity = 3,870 cps; mp = 12° C. (BASF, Parsippany, NJ) |

Example 1

This example illustrates a procedure for making a coating composition and coating a polyethylene terephthalate film during the interdraw stage of the film manufacturing process.

Eastek® 1300 sulfopolyester (43.6 L; 13.1 Kg of polymer) was added to a 55 gallon mixing tank and agitation begun. De-ionized water was added under agitation for efficient mixing to bring the contents of the tank to the 25 gal mark. The following materials were added onto the resulting dispersion in the order given: 9.5 L of 0.45% poly (acrylamide/acrylic acid) sodium salt (40 g of polymer); 181 mL of Tetronic® 90R4 block copolymer (100% solids) (200 g of polymer), 1.46 L of OX-50 (32% in ethylene glycol) (500 g of silica), and 1.9 L of Renex® 690 surfactant (20% solution in water) (400 g of surfactant). De-ionized water was added under agitation to bring the contents of the tank to the 50 gal mark and the resulting dispersion agitated for an additional 15 min. The resulting coating composition contained 7.5% total solids.

The coating composition was used for an interdraw coating during the manufacture of a polyethylene terephthalate film. The wet coating thickness, measured by an infra-red gauge, was 7.5 to 8.5 microns. The dry coating thickness was 0.16 micron. The dry coating weight was 0.029 g/m$^2$. The dry coating contains 92.0% by weight sulfopolyester, 0.28% by weight poly(acrylamide/acrylic acid) sodium salt, 1.4% by weight block copolymer, 3.5% by weight silica, and 2.8% by weight surfactant. The coated film had excellent adhesion to water-based layers.

Example 2

This example illustrates a procedure for making a coating composition and coating a polyethylene terephthalate film.

The procedure of Example 1 was repeated, except that 65.4 L of Eastek® 1300 sulfopolyester (19.60 Kg), 14.2 L of 0.45% poly(acrylamide/acrylic acid) sodium salt (60 g), 362 mL of Tetronic® 90R4 block copolymer (400 g), 1.46 L of OX-50 (32% in ethylene glycol) (500 g of silica), and 1.9 L of Renex® 690 surfactant (20% solution in water) (400 g of surfactant) was used. The resulting coating composition contained 11.2% total solids.

The resulting coating composition was used as an interdraw coating during the manufacture of a polyethylene terephthalate film. The wet coating thickness, measured by an infra-red gauge, was 7.5 to 8.5 microns. The dry coating thickness was 0.23 micron. The dry coating weight was 0.043 g/m$^2$. The dry coating contains 93.5% by weight sulfopolyester, 0.29% by weight poly(acrylamide/acrylic acid) sodium salt, 1.9% by weight block copolymer, 2.4% by weight silica, and 1.9% by weight surfactant. The coated film had good adhesion to water-based layers.

Example 3

This example illustrates a procedure for making a coating composition and coating a polyethylene terephthalate film.

The procedure of Example 1 was repeated, except that the wet coating thickness, measured by an infra-red gauge, was 4.5 to 5.5 microns. The dry coating thickness was 0.10 micron. The dry coating weight was 0.02 g/m$^2$. The coated film had good adhesion to water-based layers.

Example 4

This example illustrates a procedure for making a coating composition and coating a polyethylene terephthalate film.

The procedure of Example 1 was repeated, except that the wet coating thickness, measured by an infra-red gauge, was 12 microns. The dry coating thickness was 0.34 micron. The dry coating weight was 0.061 g/m$^2$. The coated film had good adhesion to water-based layers.

Example 5

This example illustrates a procedure for making a coating composition and coating a polyethylene terephthalate film.

The procedure of Example 1 was repeated, except that 9.52 L of 4% poly(acrylamide/acrylic acid) sodium salt (400 g of polymer) and 42.5 L of Eastek® 1300 sulfopolyester (12.740 Kg of polymer) were used.

The wet coating thickness, measured by an infra-red gauge, was 7.5 to 8.5 microns. The dry coating thickness was 0.16 micron. The dry coating weight was 0.029 g/m$^2$. The dry coating contains 89.5% by weight sulfopolyester, 2.8% by weight poly(acrylamide/acrylic acid) sodium salt, 1.3% by weight block copolymer, 3.5% by weight silica, and 2.8% by weight surfactant. The coated film had good adhesion to water-based layers.

Example 6

This example illustrates a procedure for making a coating composition and coating a polyethylene terephthalate film.

The procedure of Example 1 was repeated, except that the 543 mL of Tetronic® 90R (600 g of polymer) and 42.5 L of Eastek® 1300 sulfopolyester (12.740 Kg of polymer) were used.

The wet coating thickness, measured by an infra-red gauge, was 7.5 to 8.5 microns. The dry coating thickness was 0.16 micron. The dry coating weight was 0.029 g/m$^2$. The dry coating contains 89.2% by weight sulfopolyester, 0.28% by weight poly(acrylamide/acrylic acid) sodium salt, 4.2% by weight block copolymer, 3.5% by weight silica, and 2.8% by weight surfactant. The coated film had good adhesion to water-based layers.

Having described the invention, we now claim the following and their equivalents.

What is claimed is:

1. A coated polyester film comprising:
   (a) an oriented polyester film, said film comprising a first surface and a second surface, and in order;
   (b) a first coating on at least one of said surfaces, said coating comprising:
      (1) about 90% by weight to about 99% by weight of at least one sulfopolyester formed from the reaction of a polyhydric alcohol with (i) at least one sulfonated polycarboxylic acid or its anhydride or lower alkyl ester and (ii) at least one unsulfonated polycarboxylic acid or its anhydride or lower alkyl ester;
      (2) about 0.10% by weight to about 4% by weight of at least one acrylamide/acrylic acid copolymer or salt of said copolymer, said copolymer having a molecular weight greater than 20,000; and
      (3) about 0.5% by weight to 7.0% by weight of at least one tetrablock copolymer resin derived from the sequential addition of ethylene oxide and then propylene oxide to ethylene diamine; wherein the % by weight of components (1), (2) and (3) is based on the total weight of components (1), (2) and (3) present in the coating; components (1), (2), and (3) together comprise at least about 85% of the weight of the dry coating; and the dry coating has a thickness of about 0.05 to about 0.40 microns; and
   (c) a second coating comprising a water-based hydrophilic formulation having an ability to function as an ink jet receptor substrate.

2. The coated film of claim 1 in which the polyester film is selected from the group consisting of polyethylene terephthalate film and polyethylene naphthanate film.

3. The coated film of claim 2 in which the first coating additionally comprises 2% by weight to about 7% by weight, based on the total weight of the dry coating, of finely divided particulate material.

4. The coated film of claim 2 in which the first coating additionally comprises 1% by weight to about 5% by weight, based on the total weight of the dry coating, of a surfactant.

5. The coated film of claim 4 in which the first coating has a thickness of about 0.1 micron to about 0.2 micron.

6. The coated film of claim 5 in which the film is polyethylene terephthalate film.

7. The coated film of claim 6 in which the first coating has a thickness of about 0.12 micron to about 0.18 micron.

8. The coated film of claim 2 comprising the first coating on the first surface and the second surface of the film.

9. The coated film of claim 2 in which the first coating comprises: (1) about 96% by weight to about 99% by weight of the at least one sulfopolyester, (2) about 1.0% by weight to about 3.0% by weight of the at least one tetrablock copolymer resin, and (3) about 0.2% by weight to about 1.0% by weight of the at least one acrylamide/acrylic acid copolymer and salts thereof; and in which components (1), (2) and (3) together comprise at least about 85% of the weight of the dry coating.

10. The coated film of claim 9 in which the at least one acrylamide/acrylic acid copolymer and salts thereof has a molecular weight of greater than 2 million and the copolymer comprises about 25% by weight to about 60% by weight of acrylic acid.

11. The coated film of claim 10 in which the film is polyethylene terephthalate film.

12. The coated film of claim 11 in which the first coating additionally comprises 2% by weight to about 7% by weight, based on the total weight of the dry coating, of finely divided particulate material.

13. The coated film of claim 12 in which the first coating additionally comprises 1% by weight to about 5% by weight, based on the total weight of the dry coating, of a surfactant.

14. The coated film of claim 13 in which the first coating has a thickness of about 0.1 micron to about 0.2 micron.

15. The coated film of claim 14 in which the first coating has a thickness of about 0.12 micron to about 0.18 micron.

16. A method for preparing a coated polyester film comprising coating a first coating composition onto the film at the interdraw stage, said coating composition comprising:

(1) about 90% by weight to about 99% by weight of at least one sulfopolyester formed from the reaction of a polyhydric alcohol with (i) at least one sulfonated polycarboxylic acid or its anhydride or lower alkyl ester and (ii) at least one unsulfonated polycarboxylic acid or its anhydride or lower alkyl ester;

(2) about 0.10% by weight to about 4% by weight of at least one acrylamide/acrylic acid copolymer or salt of said copolymer, said copolymer having a molecular weight greater than 20,000; and (3) about 0.5% by weight to 7.0% by weight of at least one tetrablock copolymer resin derived from the sequential addition of ethylene oxide and then propylene oxide to ethylene diamine;

wherein the % by weight of components (1), (2) and (3) is based on the total weight of components (1), (2) and (3) present in the first coating composition; components (1), (2) and (3) together comprise at least about 85% of the weight of the dry coating; and the composition comprises about 3% by weight to about 18% by weight total solids, followed by coating a second coating composition comprising a water-based hydrophilic formulation having an ability to function as an ink jet receptor substrate.

17. The method of claim 16 in which the at least one acrylamide/acrylic acid copolymer and salts thereof has a molecular weight greater than 2 million and comprises about 25% by weight to about 60% by weight of acrylic acid.

* * * * *